United States Patent
Benz et al.

(10) Patent No.: US 12,505,922 B2
(45) Date of Patent: Dec. 23, 2025

(54) DEVICES AND METHODS FOR DETECTING ERRORS DURING FIRMWARE UPDATES

(71) Applicant: Hill-Rom Services Inc., Batesville, IN (US)

(72) Inventors: Eric Benz, Batesville, IN (US); Ed Pizzella, Batesville, IN (US); Archana Vaidyanathan, Batesville, IN (US); Rakesh Karunakaran, Batesville, IN (US)

(73) Assignee: HILL-ROM SERVICES, INC., Batesville, IN (US)

( * ) Notice: Subject to any disclaimer, the term of this patent is extended or adjusted under 35 U.S.C. 154(b) by 298 days.

(21) Appl. No.: 18/320,666

(22) Filed: May 19, 2023

(65) Prior Publication Data

US 2023/0377735 A1   Nov. 23, 2023

Related U.S. Application Data

(60) Provisional application No. 63/344,201, filed on May 20, 2022.

(51) Int. Cl.
*G06F 8/65* (2018.01)
*G16H 40/40* (2018.01)

(52) U.S. Cl.
CPC .............. *G16H 40/40* (2018.01); *G06F 8/65* (2013.01)

(58) Field of Classification Search
None
See application file for complete search history.

(56) References Cited

U.S. PATENT DOCUMENTS

| | | | |
|---|---|---|---|
| 7,240,188 B2 * | 7/2007 | Takata | G06F 8/656 713/1 |
| 7,409,539 B2 | 8/2008 | Arnez et al. | |
| 10,176,888 B2 * | 1/2019 | Charlton | G16H 40/63 |
| 10,893,037 B2 | 1/2021 | Baker et al. | |
| 10,923,228 B2 | 2/2021 | Volpe | |
| 11,086,609 B2 | 8/2021 | Housel et al. | |

(Continued)

FOREIGN PATENT DOCUMENTS

| | | | | |
|---|---|---|---|---|
| DE | 202019104587 U1 | 11/2019 | | |
| GB | 2512545 A | * 10/2014 | ............. | G06F 21/44 |
| JP | 2019185507 A | * 10/2019 | | |

*Primary Examiner* — Philip Wang
(74) *Attorney, Agent, or Firm* — DINSMORE & SHOHL LLP (57) ABSTRACT

A device includes a master control and one or more circuit boards. The master control receives an executable file containing software associated with circuit boards, extracts a piece of software from the executable file, determines whether a version of the piece of software is more desirable than a version of software installed on an associated circuit board, and upon determination that the version of the piece of software is more desirable, install the piece of software onto the associated circuit board by transmitting the piece of software to the associated circuit board as a plurality of data packets, determining whether an acknowledgment of each data packet is received from the associated circuit board within a threshold time period, and upon determination that acknowledgment of at least one data packet is not received from the associated circuit board within the threshold time period, restarting the installation of the piece of software.

18 Claims, 5 Drawing Sheets

(56) References Cited

U.S. PATENT DOCUMENTS

| | | | |
|---|---|---|---|
| 2003/0095648 A1* | 5/2003 | Kaib | A61B 5/0006 |
| | | | 379/106.02 |
| 2006/0111758 A1 | 5/2006 | Nisani et al. | |
| 2018/0285094 A1* | 10/2018 | Housel | G06F 8/65 |
| 2019/0056924 A1* | 2/2019 | Jiang | H04W 4/50 |
| 2019/0180869 A1* | 6/2019 | Volpe | A61N 1/0484 |
| 2019/0286452 A1* | 9/2019 | Carlson | G06F 9/4416 |
| 2020/0035358 A1* | 1/2020 | Williams | G16H 40/40 |
| 2021/0187223 A1 | 6/2021 | Sing et al. | |
| 2021/0240563 A1* | 8/2021 | Meyer | G06F 8/61 |

* cited by examiner

DEVICES AND METHODS FOR DETECTING ERRORS DURING FIRMWARE UPDATES

CROSS-REFERENCE TO RELATED APPLICATION

This application claims priority to U.S. Provisional Application No. 63/344,201 filed on May 20, 2022, the entire contents of which is hereby incorporated by reference herein.

FIELD

The present disclosure generally relates to updating firmware, and more particularly, to devices and methods for detecting errors during firmware updates.

BACKGROUND

Modern facility equipment (e.g., medical facility equipment) is often controlled by one or more circuit boards. Each circuit board in a piece of equipment may be controlled by firmware, which may need to be periodically updated with new firmware versions. However, not every circuit board in a piece of equipment may need updated firmware at the same time. As such, it may be desirable to update firmware for one circuit board in a piece of equipment without re-installing the firmware on the other circuit boards in the equipment. Furthermore, if a plurality of circuit boards in a piece of equipment receive updated firmware simultaneously or sequentially, and an error occurs during the installation of firmware for one board, it may be desirable to restart the firmware installation for the board having the error, without the need to re-install the firmware for the other circuit boards as well.

BRIEF DESCRIPTION OF THE DRAWINGS

In one aspect, a method may include a master control and one or more circuit boards. The master control may comprise one or more processors configured to receive an executable file containing one or more pieces of software associated with one or more of the circuit boards, extract a piece of software from the executable file, and determine whether a version of the piece of software is more desirable than a version of software installed on an associated circuit board. Upon determination that the version of the piece of software is more desirable than the version of software installed on the associated circuit board, the one or more processors may install the piece of software onto the associated circuit board by transmitting the piece of software to the associated circuit board as a plurality of data packets, and determining whether an acknowledgment of each data packet is received from the associated circuit board within a threshold time period. Upon determination that acknowledgment of at least one data packet is not received from the associated circuit board within the threshold time period, the one or more processors may restart installation of the piece of software.

In another aspect, a method to be performed by a processor of a computing device is provided. The method may include receiving an executable file containing one or more pieces of software associated with one or more circuit boards of the computing device, extracting a piece of software from the executable file, and determining whether a version of the piece of software is more desirable than a version of software installed on an associated circuit board. Upon determination that the version of the piece of software is more desirable than the version of software installed on the associated circuit board, the method may include installing the piece of software onto the associated circuit board by transmitting the piece of software to the associated circuit board as a plurality of data packets and determining whether an acknowledgment of each data packet is received from the associated circuit board within a threshold time period. Upon determination that acknowledgment of at least one data packet is not received from the associated circuit board within the threshold time period, the method may include restarting installation of the piece of software.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure relates to devices and methods for detecting errors during firmware updates. In particular, updated firmware for a plurality of circuit boards on a piece of equipment may be transmitted to a master control board. The master control board may compare the received firmware version to the firmware version installed on each of the circuit boards. For each circuit board that does not have the most recent version of firmware, the master control board may transfer the firmware to the circuit board to be installed. The master control board may transfer the updated firmware in a plurality of data packets, and may receive an acknowledgment of each data packet from the circuit board. If an acknowledgment of a data packet is not received from a circuit board within an expected amount of time, the data packet may be resent or the installation of the firmware may be restarted. While the examples disclosed herein relate specifically to updating firmware, it should be understood that in other examples, the devices and methods disclosed herein may be used to install other types of software, such as an operating system or other types of applications.

Equipment, such as medical facility equipment, may contain embedded software that controls their operation and functionality. In particular, a piece of medical equipment (e.g., a hospital bed) may include a plurality of circuit boards, with each circuit board controlling a different aspect of operation of the medical equipment. For example, one circuit board may control the capture of patient data, another board may control patient therapy, and another board may control instrument displays.

Each circuit board may run separate firmware to control the board's operation. The firmware is typically maintained by the manufacturer of the medical equipment, which may periodically produce new versions of the firmware for one or more of the circuit boards to improve the functionality of the medical equipment, to correct bugs, to activate features, to protect against malware, to protect against hacking, and the like. When a new version of firmware is available, it must be installed onto the medical equipment before the medical equipment can use the firmware.

In addition to the various circuit boards that control various functionality of a piece of medical equipment, the medical equipment may also include a master control board. The master control board may communicate with all of the other circuit boards in a piece of medical equipment via a controller area network (CAN) bus. In embodiments, when new firmware is available, an executable file containing the new firmware may be transferred to the master control board. The master control board may then transmit executable files containing the appropriate firmware to each individual circuit board so that the firmware of each circuit board can be updated to the newest version.

The executable file that is transferred to the master control board typically contains the firmware for every circuit board of a piece of medical equipment. However, if a new version of firmware for one circuit board of a piece of medical equipment is available, it may be desirable to install the new firmware for that circuit board without re-installing the existing firmware onto every other circuit board. Accordingly, in embodiments disclosed herein, after receiving the executable file containing the firmware for every circuit board in a piece of medical equipment, the master control board may compare the firmware version currently installed on each circuit board to the firmware version contained in the executable file. The master control board may then install the new version of firmware only onto circuit boards that do not already have the latest version of the appropriate firmware.

In addition, one or more errors may occur during installation of firmware onto a particular circuit board. If an error occurs during firmware installation onto a circuit board, it may be desirable to re-install the firmware onto the circuit board to ensure proper installation. One way to accomplish this may be to wait until the installation of firmware onto a circuit board is complete, and then check whether the firmware installed on the circuit board matches the firmware that was intended to be installed. However, this requires waiting until the firmware installation is complete before attempting to re-install the firmware, which may increase the amount of time required to complete firmware installation.

As such, it may be desirable to determine whether an error occurs during installation of firmware onto a circuit board such that installation of the firmware may be re-started immediately after an error occurs.

Accordingly, in embodiments disclosed herein, the master control board of a piece of medical equipment may transmit new firmware to a circuit board in a series of data packets. The master control board may then expect an acknowledgment from the circuit board upon receipt of each data packet. If the acknowledgment of the data packet is not received within an expected period of time, it may be assumed that an error occurred in the transmission of that data packet. Accordingly, the master control board may attempt to resend that particular data packet. If acknowledgment of receipt of the data packet continues to not be received within an expected period of time, installation of the firmware may be automatically restarted.

While the present disclosure relates specifically to medical equipment such as hospital beds, it should be understood that this is merely an example. That is, the systems and methods described herein may be used to update firmware on any type of equipment, including, but not limited to, overhead lifts, vital monitoring equipment, control devices, wall-mounted displays, nurses station equipment, surgical equipment, furniture, wheelchairs, and the like. Further, the systems and methods described herein may be used for updating firmware on other, non-medical equipment such as, for example, office equipment such as printers, fax machines, communications equipment, farm equipment, manufacturing equipment, and the like. In addition, while the present disclosure relates specifically to medical facilities such as hospitals, physician offices, urgent care centers, clinics, and the like, it should be understood that this is merely an example. That is, the systems and methods described herein may be located in other locations outside of medical facilities, such as offices, factories, farms, and/or the like.

Figure 1:
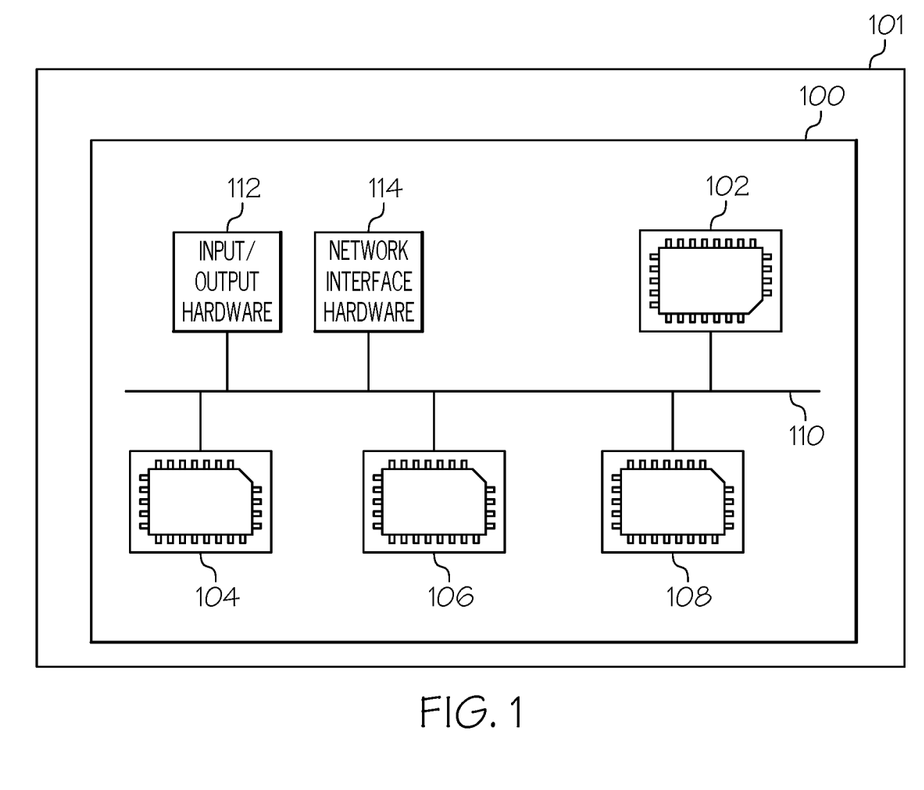
FIG. 1 schematically depicts an example computing device integrated with a hospital bed, according to one or more embodiments shown and described herein.

FIG. 1 depicts a schematic diagram of an example computing device 100 that may be integrated into a hospital bed 101. The computing device 100 described herein may be a computing system or a specialized device or system in various embodiments. Accordingly, while in some embodiments, the computing device 100 may be a computer with the requisite hardware, software, and/or firmware, in some embodiments, the computing device 100 may be configured as a special purpose device or system designed specifically for performing particular tasks associated with operating a hospital bed (e.g., monitoring patient data, providing therapeutics) as well as the functionality described herein. While embodiments described herein are directed towards hospital beds, it should be understood that in other examples, the computing device 100 may be utilized with other devices or apparatuses that run embedded or other software. In these examples, the computing device 100 may be used to automatically update software on such other devices or apparatuses in a peer-to-peer manner, using the techniques described herein.

As illustrated in FIG. 1, the computing device 100 includes a master control board 102 and circuit boards 104, 106, and 108. The computing device 100 also includes input/output hardware 112 and network interface hardware 114. A communication path 110 (e.g., a CAN bus) is also included in the computing device 100 of FIG. 1 and may facilitate communication among the components of the computing device 100. For example, the communication path 110 may communicatively couple the master control board 102 and the circuit boards 104, 106, 108 to each other.

As discussed above, each of the circuit boards 104, 106, 108 may control different functionalities of the hospital bed associated with the computing device 100. In the illustrated example, three circuit boards are shown in addition to the master control board 102. However, it should be understood that in other examples, any number of circuit boards may be included in the computing device 100. Furthermore, as discussed above, the master control board 102 may be utilized to update the firmware of the circuit boards 104, 106, 108, as disclosed herein.

The input/output hardware 112 may include a monitor, a keyboard, a mouse, a printer, a camera, a microphone, a speaker, a touch-screen, a motor controller, a solenoid and valve driver, an analog or a digital sensor (e.g., temperature, pressure, positional, etc.) and/or other device for receiving, sending, and/or presenting data, reading sensors or controlling motors, valves, solenoids and the like, particularly those used in medical devices, healthcare systems, and the like. For example, the input/output hardware 112 may include a serial bus, and/or another industry standard bus. In a particular embodiment, the input/output hardware 112 may be hardware that is certified as compliant with applicable industry standards.

The network interface hardware 114 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 114 may be used to facilitate communication between external storage devices, user computing devices, server computing devices, external control devices, and/or the like via a network, such as, for example, a local network, the Internet, and/or the like. In particular, in the illustrated example, the network interface hardware 114 may be used to receive firmware updates from an external device, as disclosed in further detail below.

One method of installing updated firmware onto the computing device 100 is to establish a hard-wired connection between the hospital bed associated with the computing device 100 and an external device, such as a smartphone running an app that can be used to install the updated firmware onto the equipment. Another option is to install updated firmware onto the computing device 100 remotely. For example, updated firmware may be transferred from a remote computing device such as a cloud server to the computing device 100. Either method may be used to update the firmware of the circuit boards 104, 106, 108 of the computing device 100, utilizing the techniques described herein.

Figure 2:
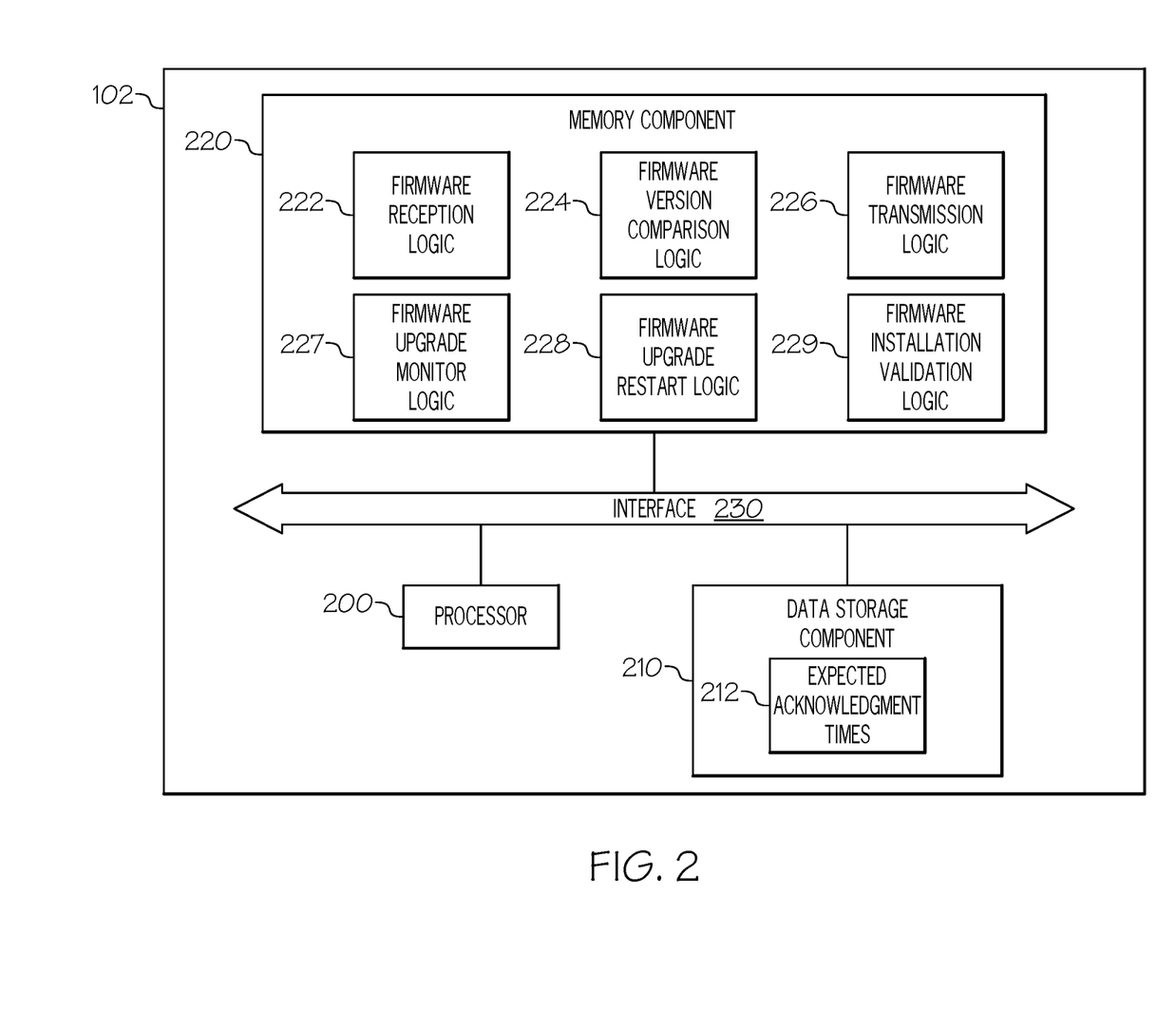
FIG. 2 schematically depicts an example master control board of the computing device of FIG. 1, according to one or more embodiments shown and described herein.

Turning now to FIG. 2, a schematic diagram of the master control board or master control 102 of FIG. 1 is shown. As illustrated in FIG. 2, the master control board 102 includes a processor 200, a data storage component 210, and a non-transitory memory component 220. A local interface 230 is also included in FIG. 2 and may be implemented as a bus or other interface to facilitate communication among the components of the memory component 220 to the processor 200.

The processor 200, such as a central processing unit (CPU), may be the central processing unit of the master control board 102, performing calculations and logic operations to execute one or more programs. The processor 200, alone or in conjunction with the other components, may be an illustrative processing device, computing device, processor, or combinations thereof, including, for example, a multi-core processor, a microcontroller, a field-programmable gate array (FPGA), or an application-specific integrated circuit (ASIC). The processor 200 may include any processing component configured to receive and execute instructions (such as from the data storage component 210 and/or the memory component 220). In some embodiments, the processor 200 may comprise a plurality of processing devices.

The data storage component 210 is generally a storage medium, and may contain one or more data repositories for storing data that is received and/or generated. The data storage component 210 may be any physical storage medium, including, but not limited to, a hard disk drive (HDD), memory (e.g., read-only memory (ROM), programmable read-only memory (PROM), random access memory (RAM), double data rate (DDR) RAM, flash memory, and/or the like), removable storage, a configuration file (e.g., text) and/or the like. While the data storage component 210 is depicted as a local device, it should be understood that the data storage component 210 may be a remote storage device, such as, for example, a server computing device, cloud-based storage device, or the like.

In the example of FIG. 2, the data storage component 210 includes expected acknowledgment times 212 associated with each of the circuit boards 104, 106, 108. In particular, the expected acknowledgment times 212 may indicate an expected time to receive an acknowledgment from each of the circuit boards 104, 106, 108 after a data packet is sent from the master control board 102 to the respective circuit board. This is discussed in further detail below. The data storage component 210 may also store other data, such as firmware updates received from external devices.

The memory component 220 may be configured as a volatile and/or a nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 220 may be configured to include various logic modules (each of which may be embodied as a computer program, firmware, or hardware, as an example).

The memory component 220 may include a plurality of logic modules or memory modules. Each of the logic modules may be embodied as a computer program, firmware, or hardware, as an example. In particular, included in the memory component is firmware reception logic 222, firmware version comparison logic 224, firmware transmission logic 226, firmware update monitor logic 227, firmware update restart logic 228, and firmware installation validation logic 229.

The firmware reception logic 222 may receive an executable file containing updated firmware for one or more of the circuit boards 104, 106, 108. In the illustrated example, the file received by the firmware reception logic 222 may contain the most recent version of firmware for each of the circuit boards 104, 106, 108. However, in some examples, the file received by the firmware reception logic 222 may contain firmware only for some of the circuit boards whose firmware version is to be updated.

In some examples, the firmware reception logic 222 may receive firmware from a device that is hard-wired or remotely connected (e.g., via Bluetooth) to the hospital bed associated with the computing device 100 (e.g., a smartphone). In other examples, the firmware reception logic 222 may receive firmware from a remote computing device (e.g., a cloud server). In some examples, a hard-wired device or a remote computing device may first transfer firmware to another component of the computing device 100 (e.g., a Linux board), which may then transfer the firmware to the master control board 102, where it may be received by the firmware reception logic 222.

As discussed above, the executable file received by the firmware reception logic 222 may contain the most recent version of firmware for each of the circuit boards 104, 106, 108. In addition, the firmware reception logic 222 may receive a hash, a checksum, a cyclic redundancy check (CRC), or another type of error detecting code associated with each piece of firmware for the individual circuit boards 104, 106, 108. After receiving the firmware executable file, the firmware reception logic 222 may extract the individual pieces of firmware associated with each of the circuit boards 104, 106, 108 contained therein. The firmware reception logic 222 may then compute an error detecting code for each piece of firmware and compare the computed error detecting code to the received error detecting code for each piece of firmware. If any of the computed error detecting codes do not match the associated received error detecting code, this may indicate that an error occurred during transmission of the firmware executable file, and the firmware reception logic 222 may request that the firmware executable file be retransmitted.

The firmware version comparison logic 224 may compare the version of each piece of firmware received by the firmware reception logic 222 to the version of firmware installed on each of the circuit boards 104, 106, 108. In particular, the firmware version comparison logic 224 may transmit a request to each of the circuit boards 104, 106, 108, via the communication path 110, requesting the current firmware version installed on each of them. Each of the circuit boards 104, 106, 108 may respond to the request by transmitting the current version of firmware they are operating back to the master control board 102 via the communication path 110.

The firmware version comparison logic 224 may receive the current version of firmware installed on each of the circuit boards 104, 106, 108 and may compare those firmware versions to the versions of firmware received by the firmware reception logic 222. If one or more of the circuit boards 104, 106, 108 are running an older version of firmware than the firmware version received by the firmware reception logic 222, the firmware for each of those boards may be updated, as disclosed herein.

The firmware transmission logic 226 may transmit the appropriate firmware to each of the one or more circuit boards 104, 106, 108 running an older version of firmware, as determined by the firmware version comparison logic 224. In particular, the firmware transmission logic 226 may transmit firmware to the appropriate one or more circuit boards in a series of data packets transmitted over the communication path 110. The data packets may then be received by the appropriate one or more circuit boards.

The firmware update monitor logic 227 may monitor the data packets being transmitted by the firmware transmission logic 226 to a circuit board, as disclosed herein. As discussed above, the firmware transmission logic 226 may transmit firmware to a circuit board in a series of data packets. For example, each data packet may comprise a small number of bytes of the firmware being transmitted. As each data packet is received by a circuit board, the circuit board may transmit an acknowledgment of the data packet to the master control board 102.

When the master control board 102 receives an acknowledgment that a data packet has been received by a circuit board, the firmware update monitor logic 227 may determine a time delay between when the data packet was sent to the circuit board and when the acknowledgment of the data packet was received. The firmware update monitor logic 227 may then compare this time delay to an expected time delay.

There is an inherent time delay between when a data packet is sent from the master control board 102 to a circuit board and when the master control board 102 receives acknowledgment of the data packet from the circuit board. This time delay may be caused by an amount of time it takes the master control board 102 to generate the data packet, an amount of time it takes the circuit board to recognize and generate the acknowledgment of the packet, an amount of time it takes the data packet and the acknowledgment to travel over the communication path 110, and other factors. Thus, a particular time delay may be expected based on the particular hardware components of the computing device 100 among other factors. Accordingly, the data storage component 210 may store expected acknowledgment times 212 for each of the circuit boards 104, 106, 108 indicating an expected time delay between when the master control board 102 transmits a data packet to each of the circuit boards and when an acknowledgment of the data packet is received from each of the circuit boards. In some examples, the expected time delay may be the same for each of the circuit boards 104, 106, 108. In other examples, the expected time delay may be different for each of the circuit boards 104, 106, 108 (e.g., the circuit boards 104, 106, 108 may have different communication hardware).

After determining the time delay between when a data packet was transmitted by the master control board 102 to a circuit board and when acknowledgment of the data packet was received by the master control board 102 from the circuit board, the firmware update monitor logic 227 may determine whether the time delay is greater than an expected time delay. In particular, the firmware update monitor logic 227 may determine whether the time delay is greater than the expected time delay by more than a threshold amount (e.g., whether the actual time delay exceeds the expected time delay by more than 50%). This threshold amount may allow for some amount of variation in the time delay due to system noise or other factors.

If the actual time delay exceeds the expected time delay by greater than the threshold amount, this may indicate that an error occurred in the transmission and/or reception of the data packet. Additionally, if acknowledgment of the data packet is never received by the master control board 102, this may also indicate that an error occurred with the transmission and/or reception of the data packet. The firmware update monitor logic 227 may perform the comparison of the actual time delay to the expected time delay associated with the transmission of each data packet of the firmware being transmitted to the circuit board. Accordingly, the firmware update monitor logic 227 may determine whether an error has likely occurred with respect to any data packets of the firmware being transmitted to the circuit board, as disclosed herein.

The firmware update restart logic 228 may cause a particular data packet to be resent or cause the installation of firmware for a circuit board to be restarted when an error is detected by the firmware update monitor logic 227, as disclosed herein. As described above, the firmware update monitor logic 227 may determine that an error has likely occurred with respect to a data packet being transmitted from the master control board 102 to a circuit board if a time delay between transmitting the data packet and receiving an acknowledgment of the data packet exceeds an expected time delay by more than a threshold amount. In addition, the firmware update monitor logic 227 may determine that an error has likely occurred with respect to the data packet if no acknowledgment of the data packet is received. If either of these situations occurs, the firmware update restart logic 228 may cause the firmware transmission logic 226 to resend the data packet at issue.

If, after resending the data packet, acknowledgment of the data packet is then received within the expected time frame, then installation of the firmware may continue with transmission of the remaining data packets to the circuit board. However, if acknowledgment of the data packet continues to be received after the expected time delay, or not received at all, then the firmware update restart logic 228 may cause installation of the firmware on the circuit board to be restarted.

In one example, the firmware transmission logic 226 may attempt to transmit a data packet a predetermined number of times (e.g., three times). If the data packet fails to be successfully acknowledged after the predetermined number of transmission attempts, the firmware update restart logic 228 may cancel the current installation of the firmware onto the circuit board and restart the installation of the firmware onto the circuit board. That is, the firmware update restart logic 228 may cause the firmware transmission logic 226 to begin re-transmitting the firmware to the circuit board starting with the first data packet. Accordingly, the master control board 102 may detect an error with installation of firmware onto a circuit board before installation is complete and automatically restart the firmware installation, thereby reducing an amount of time needed to successfully update the firmware on the circuit board.

The firmware installation validation logic 229 may validate the installation of the firmware onto the circuit board after the installation is complete. As discussed above, the firmware reception logic 222 may receive an error detecting code such as a hash or checksum associated with the firmware. Thus, after firmware is installed onto a circuit board, the firmware installation validation logic 229 may calculate the error detecting code for the firmware that was installed onto the circuit board. The firmware installation validation logic 229 may then compare the calculated error detecting code to the error detecting code received by the firmware reception logic 222. If the error detecting codes do not match, then it may be presumed that an error occurred during installation of the firmware and the firmware update restart logic 228 may cause the firmware to be reinstalled on the circuit board. However, if the error detecting codes do match, the firmware installation validation logic 229 may transmit a signal to the circuit board indicating that the updated firmware has been successfully installed.

Figure 3:
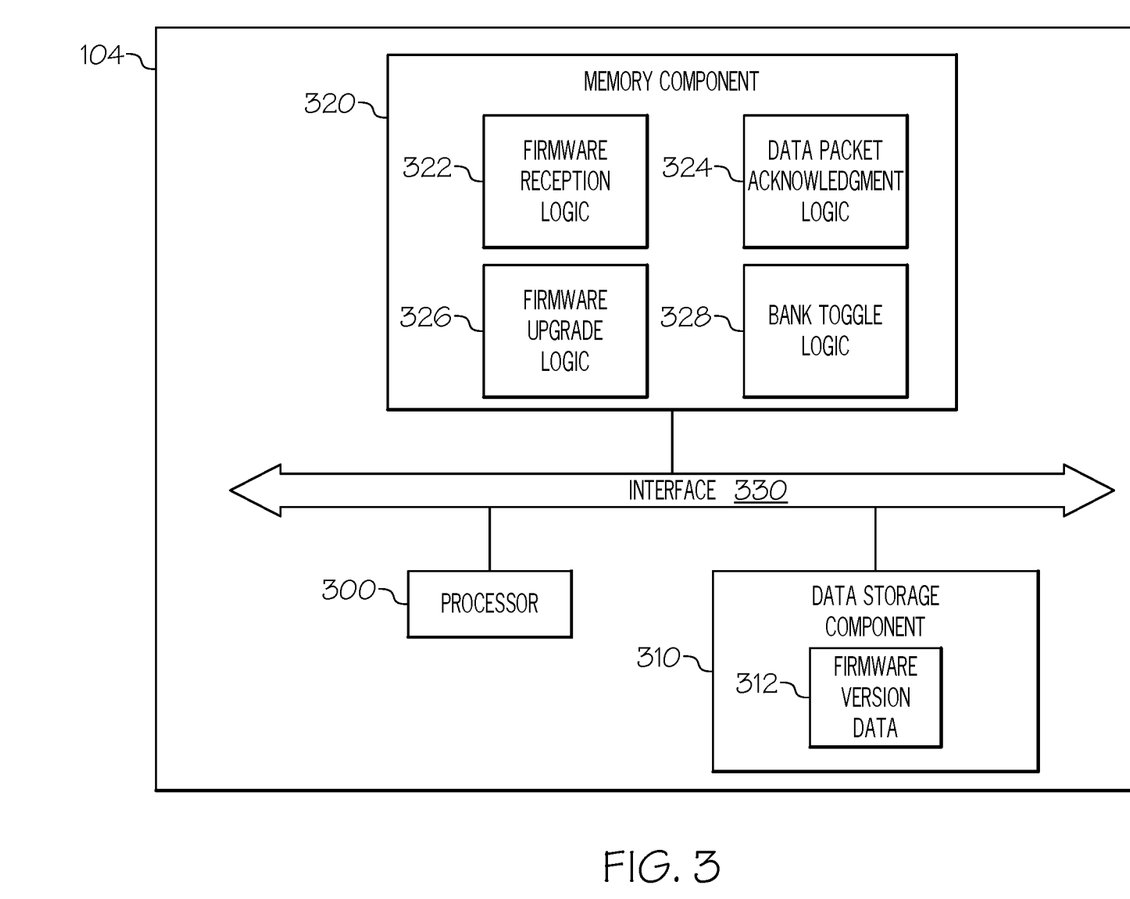
FIG. 3 schematically depicts an example circuit board of the computing device of FIG. 1, according to one or more embodiments shown and described herein.

Turning now to FIG. 3, a schematic diagram of the circuit board 104 of FIG. 1 is shown. While the example of FIG. 3 schematically illustrates the circuit board 104 of FIG. 1, it should be understood that the circuit boards 106 and 108 of FIG. 1 may be constructed in a similar manner. As illustrated in FIG. 3, the circuit board 104 includes a processor 300, a data storage component 310, and a non-transitory memory component 320. A local interface 330 is also included in FIG. 3 and may be implemented as a bus or other interface to facilitate communication among the components of the memory component 320 to the processor 300.

The processor 300, such as a central processing unit (CPU), may be the central processing unit of the circuit board 104 102, performing calculations and logic operations to execute one or more programs. The processor 300, alone or in conjunction with the other components, may be an illustrative processing device, computing device, processor, or combinations thereof, including, for example, a multi-core processor, a microcontroller, a field-programmable gate array (FPGA), or an application-specific integrated circuit (ASIC). The processor 300 may include any processing component configured to receive and execute instructions (such as from the data storage component 310 and/or the memory component 320). In some embodiments, the processor 300 may comprise a plurality of processing devices.

The data storage component 310 is generally a storage medium, and may contain one or more data repositories for storing data that is received and/or generated. The data storage component 310 may be any physical storage medium, including, but not limited to, a hard disk drive (HDD), memory (e.g., read-only memory (ROM), programmable read-only memory (PROM), random access memory (RAM), double data rate (DDR) RAM, flash memory, and/or the like), removable storage, a configuration file (e.g., text) and/or the like. While the data storage component 310 is depicted as a local device, it should be understood that the data storage component 310 may be a remote storage device, such as, for example, a server computing device, cloud-based storage device, or the like.

In the example of FIG. 3, the data storage component 310 includes firmware version data 312 associated with the circuit board 104. In particular, the firmware version data 312 may indicate the current version of firmware installed on the circuit board 104. When the firmware is updated on the circuit board 104, as disclosed herein, the firmware version data 312 may be updated to indicate the new firmware version installed on the circuit board 104. The data storage component 310 may also store other data, such as firmware updates received from the master control board 102.

The memory component 320 may be configured as a volatile and/or a nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 320 may be configured to include various logic modules (each of which may be embodied as a computer program, firmware, or hardware, as an example).

The memory component 320 may include a plurality of logic modules or memory modules. Each of the logic modules may be embodied as a computer program, firmware, or hardware, as an example. In particular, included in the memory component is firmware reception logic 322, data packet acknowledgment logic 324, firmware update logic 326, and bank toggle logic 328.

In embodiments, the memory component 320 may divided into an active bank and an inactive bank. Each bank may contain the same logic modules and may operate in the same manner. The active bank may contain the most current version of firmware on the circuit board 104 and may actively operate to run various programs and perform functionality of the circuit board 104. The inactive bank may contain an older version of firmware and may not actively run any programs or otherwise control the circuit board 104.

When a new version of firmware is to be installed onto the circuit board 104, it may be desirable to do so without hindering operation of the circuit board 104. As such, the new version of firmware may be installed onto the inactive bank while the active bank continues to operate unencumbered by the firmware installation. When the firmware is successfully installed onto the inactive bank, a toggle command may be given, as disclosed in further detail below, to toggle the active bank to become the inactive bank and the inactive bank to become the active bank. Then, the next time that the circuit board 104 is power cycled, the newly toggled active bank, which now has the updated firmware, will control operation of the circuit board 104. This allows firmware to be installed onto the circuit board 104 without affecting its operation during the installation process. For purposes of illustration, only one bank is shown in the example of FIG. 3. However, it should be understood that the memory component 320 includes a second bank with the same memory modules. In the discussion below of the logic modules of the memory component 320, it should be understood that the operations are performed by the logic modules of the inactive bank of the memory component 320.

The firmware reception logic 322 may receive updated firmware from the master control board 102. As discussed above, when the firmware of the circuit board 104 is to be updated, the master control board 102 may transmit the updated firmware to the circuit board 104 in a series of data packets. Thus, each data packet may be received by the firmware reception logic 322.

As each data packet is received by the firmware reception logic 322, the data packet acknowledgment logic 324 may transmit an acknowledgment of reception of the data packet to the master control board 102 via the communication path 110. This acknowledgment may be utilized by the master control board 102 to determine whether an error has occurred in transmission of the data packet, as disclosed above.

After all of the data packets associated with the updated firmware have been received by the firmware reception logic 322, the firmware update logic 326 may install the received firmware onto the circuit board 104. After the firmware is installed, the firmware update logic 326 may transmit a message to the master control board 102 indicating that the firmware has been installed. The master control board 102 may then validate the installation of the firmware, as discussed above.

As discussed above, after the master control board 102 validates that the new firmware version has been successfully installed onto the circuit board 104, the master control board 102 may transmit a message to the circuit board 104 indicating as much. When this message is received by the circuit board 104, the bank toggle logic 328 may cause the inactive bank, upon which the updated firmware has been successfully installed, to become the active bank. The bank toggle logic 328 may also cause the active bank to become the inactive bank. As such, upon the next power cycle of the circuit board 104, the circuit board 104 will run the newly installed firmware version.

Figure 4:
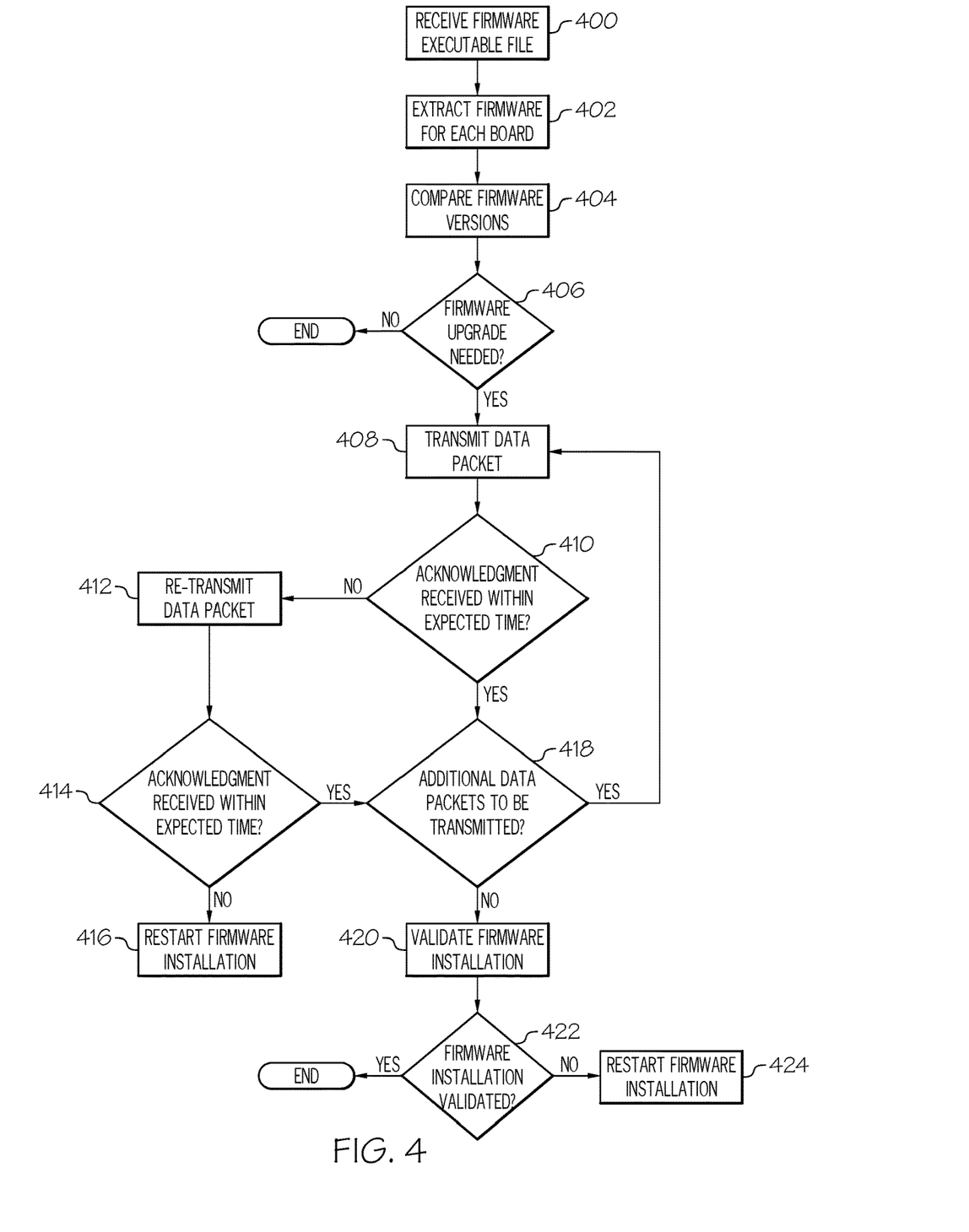
FIG. 4 depicts a flow diagram of an example method to be performed by the master control board of FIG. 2 to update firmware on one or more circuit boards.

FIG. 4 depicts a flow diagram of an illustrative method of operating the master control board 102 of FIGS. 1 and 2. At block 400, the firmware reception logic 222 receives an executable file containing firmware for one or more of the circuit boards 104, 106, 108. In one example, the firmware reception logic 222 may receive the firmware file from a device connected to the hospital bed associated with the computing device 100 (e.g., a smartphone). In another example, the firmware reception logic 222 may receive the firmware file from a remote computing device (e.g., a cloud server). In another example, the firmware reception logic 222 may receive the firmware file from another board that is part of the computing device 100 (e.g., a Linux board). The firmware reception logic 222 may also receive one or more error checking codes associated with each piece of firmware contained in the firmware executable file.

At block 402, the firmware reception logic 222 extracts the individual pieces of firmware from the received firmware executable file. That is, the firmware reception logic 222 may extract a first piece of firmware associated with the circuit board 104, a second piece of firmware associated with the circuit board 106, and a third piece of firmware associated with the circuit board 108.

At block 404, the firmware version comparison logic 224 compares the version of each piece of firmware extracted from the received firmware executable file to the firmware versions on each of the circuit boards 104, 106, 108. At block 406, the firmware version comparison logic 224 determines whether a firmware update is needed for any of the circuit boards 104, 106, 108 based on the comparison. That is, the firmware version comparison logic 224 determines whether each of the circuit boards 104, 106, 108 already has the most desirable version of firmware. In the illustrated example, the firmware version comparison logic 224 may determine whether each of the circuit boards 104, 106, 108 has the most recent version of the firmware. However, in other examples, the firmware version comparison logic 224 may determine whether the version of firmware installed on any of the circuit boards 104, 106, 108 is less desirable than another available firmware version, even if the other available version is not the most recent version. Another version of firmware that is not the most recent version may be more desirable for a variety of reasons (e.g., the newer version may have a software bug, or an older version may be more appropriate for a particular circuit board).

If the firmware version comparison logic 224 determines that each of the circuit boards 104, 106, 108 already have the most recent version of firmware and no firmware update is needed (NO at block 406), then the example of FIG. 4 ends. Alternatively, if the firmware version comparison logic 224 determines that one or more of the circuit boards 104, 106, 108 do not have the most recent version of firmware and a firmware update is needed, control passes to block 408.

At block 408, the firmware transmission logic 226 begins transmitting the new firmware version to a circuit board that needs updated firmware. In particular, the firmware transmission logic 226 the firmware transmission logic 226 transmits the first data packet of the updated firmware to the appropriate circuit board.

At block 410, the firmware update monitor logic 227 determines whether the master control board 102 has received acknowledgment of transmission of the data packet from the circuit board that the data packet was transmitted to. In particular, the firmware update monitor logic 227 may determine whether acknowledgment of the data packet is received within a threshold amount of an expected time delay. If acknowledgment of the data packet is received within an expected time (YES at block 410), control passes to block 418. If acknowledgment of the data packet is not received within an expected time (NO at block 410), control passes to block 412.

At block 412, the firmware update restart logic 228 causes the firmware transmission logic 226 to re-transmit the data packet that was not acknowledged within the expected time. At block 414, the firmware update monitor logic 227 determines whether acknowledgment of the re-transmitted data packet is received within an expected time. If acknowledgment of the re-transmitted data packet is received within the expected time (YES at block 414), then control passes to block 418. Alternatively, if acknowledgment of the re-transmitted data packet is not received within the expected time (NO at block 414), then at block 414, the firmware update restart logic 228 causes the master control board 102 to restart the firmware installation.

In the example of FIG. 4, re-transmission of a failed data packet is only attempted once before installation of the firmware is restarted. However, in other examples, re-transmission of a failed data packet may be attempted multiple times before installation of the firmware is restarted. In these examples, blocks 412 and 414 may be repeated any number of times until acknowledgment of the data packet is received within the expected time or until a predetermined number of attempts are reached without receiving acknowledgment of the data packet within the expected time.

At block 418, the firmware transmission logic 226 determines whether additional data packets of the firmware need to be transmitted or whether all data packets have been transmitted. If additional data packets need to be transmitted (YES at block 418), control returns to block 408 and the firmware transmission logic 226 transmits the next data packet of the firmware to the circuit board needing the firmware update. Alternatively, if no additional data packets need to be transmitted (NO at block 418), control passes to block 420.

At block 420, the firmware installation validation logic 229 verifies whether the updated firmware was successfully installed onto the circuit board. In particular, the firmware installation validation logic 229 may calculate an error detecting code associated with the installed firmware and compare the calculated error detecting code to the error detecting code received by the firmware reception logic 222. If the calculated error detecting code does not match the received error detecting code, indicating that the firmware was not successfully installed onto the circuit board (NO at block 422), then at block 424, the firmware update restart logic 228 restarts installation of the firmware. Alternatively, if the calculated error detecting code matches the received error detecting code, indicating that the firmware was successfully installed onto the circuit board (YES at block 422), then the example of FIG. 4 ends.

The method of FIG. 4 allows errors that occur during installation of updated firmware to be detected before the firmware installation is complete. As such, installation of firmware can be restarted when errors occur during installation without the need to wait for installation is complete to verify whether the firmware was successfully installed.

Figure 5:
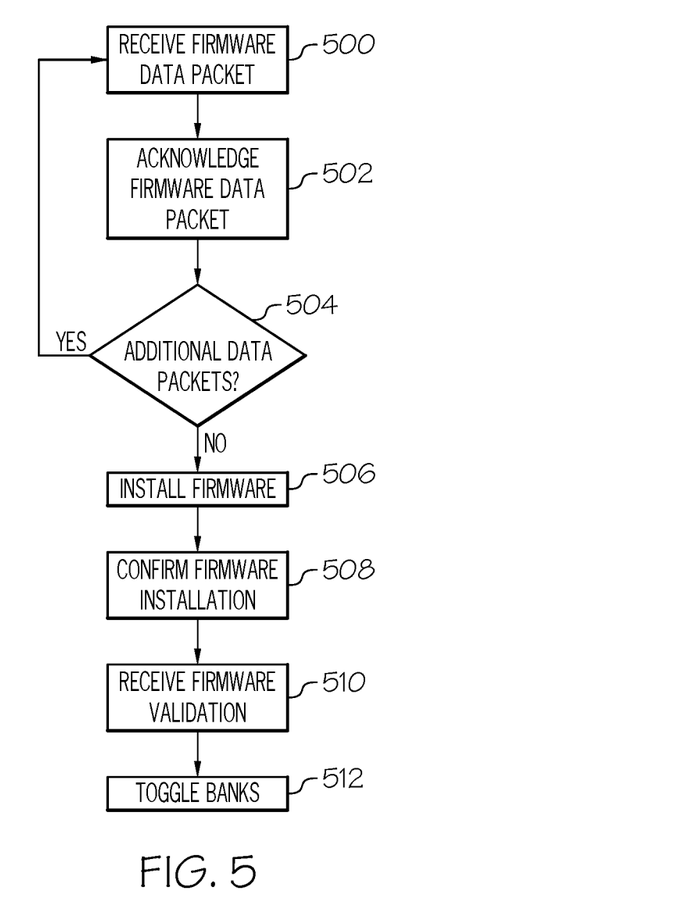
FIG. 5 depicts a flow diagram of an example method to be performed by the circuit board of FIG. 3 to update the firmware on the circuit board.

FIG. 5 depicts a flow diagram of an illustrative method of operating the circuit board 104 of FIGS. 1 and 3. The method of FIG. 5 may also be utilized by the circuit boards 106 and 108 of FIGS. 1 and 3. In particular, the method of FIG. 5 may be performed by the inactive bank of the circuit board 104, 106, or 108.

At block 500, the firmware reception logic 322 receives the first data packet of updated firmware to be installed on the circuit board 104. At block 502, the data packet acknowledgment logic 324 transmits an acknowledgment that the data packet has been received to the master control board 102.

At block 504, the firmware reception logic 322 determines whether additional data packets of the updated firmware need to be received or if all data packets have been received. If additional data packets need to be received (YES at block 504), control returns to block 500 and the next data packet is received by the firmware reception logic 322. Alternatively, if all data packets of the updated firmware have been received and no additional data packets are needed (NO at block 504), control passes to block 506.

At block 506, the firmware update logic 326 installs the received firmware onto the circuit board 104. Then, at block 508, the firmware update logic 326 transmits a signal to the master control board 102 indicating that the updated firmware has been installed onto the circuit board 104.

At block 510, the circuit board 104 receives a signal from the master control board 102 indicating that the installed firmware has been validated. Then, at block 512, the bank toggle logic 328 causes the inactive bank, onto which the updated firmware was installed, to become the active bank, and causes the active bank to become the inactive bank.

It should now be understood that embodiments described herein are directed to devices and methods for detecting errors during firmware updates. A piece of medical equipment may contain a master control board and a plurality of other circuit boards that each control different functionalities of the medical equipment. When a new version of firmware is available for one or more of the circuit boards, an executable file containing firmware for all of the circuit boards may be transmitted to the master control board from either a hardwired external device or a remote computing device.

The master control board may transmit any needed firmware updates to the appropriate circuit boards via a plurality of data packets. If an acknowledgement of a data packet transmitted to a circuit board is not received within an expected time by the master control board, the master control board may attempt to resend the data packet. If the data packet is unable to be successfully sent after a predetermined number of attempts, installation of the firmware may be restarted. Accordingly, detection of an error during firmware installation may be detected before the entire firmware file is transferred to the circuit board, thereby increasing efficiency of firmware installation.

Further aspects of the invention are provided by the subject matter of the following clauses.

A device comprising a master control; and one or more circuit boards; the master control comprising one or more processors configured to at least: receive an executable file containing one or more pieces of software associated with one or more of the circuit boards; extract a piece of software from the executable file; determine whether a version of the piece of software is more desirable than a version of software installed on an associated circuit board; and upon determination that the version of the piece of software is more desirable than the version of software installed on the associated circuit board, install the piece of software onto the associated circuit board by: transmitting the piece of software to the associated circuit board as a plurality of data packets; determining whether an acknowledgment of each data packet is received from the associated circuit board within a threshold time period; and upon determination that acknowledgment of at least one data packet is not received from the associated circuit board within the threshold time period, restarting installation of the piece of software.

The device of any preceding clause, wherein the one or more processors are further configured to: upon determination that acknowledgment of the at least one data packet is not received from the associated circuit board within the threshold time period, re-transmit the at least one data packet to the associated circuit board one or more times until acknowledgment of the at least one data packet is received from the associated circuit board; and restart the installation of the piece of software when the at least one data packet has been transmitted to the associated circuit board a predetermined number of times without receiving acknowledgment of the at least one data packet within the threshold time period.

The device of any preceding clause, wherein the threshold time period is a threshold amount more than an expected time delay between when a first data packet is transmitted from the master control to the associated circuit board and when acknowledgment of the first data packet is expected to be received by the master control.

The device of any preceding clause, wherein the one or more processors are further configured to: determine whether the piece of software has been successfully installed onto the associated circuit board; and upon determination that the piece of software has not been successfully installed onto the associated circuit board, restart the installation of the piece of software onto the associated circuit board.

The device of any preceding clause, wherein the one or more processors are further configured to determine whether the piece of software has been successfully installed onto the associated circuit board by: calculating a first error detecting code of the piece of software that has been installed onto the associated circuit board; comparing the first error detecting code to a second error detecting code, received along with the executable file, associated with the piece of software; and determining that the piece of software has been successfully installed onto the associated circuit board when the first error detecting code matches the second error detecting code.

The device of any preceding clause, wherein the first error detecting code comprises a checksum.

The device of any preceding clause, wherein the one or more processors are further configured to receive the executable file from a second device connected to the device.

The device of any preceding clause, wherein the one or more processors are further configured to receive the executable file from a remote computing device.

The device of any preceding clause, wherein the device is associated with a hospital bed.

The device of any preceding clause, wherein at least one of the circuit boards comprises one or more second processors, and one or more second non-transitory memory modules communicatively coupled to the one or more second processors and storing second machine-readable instructions that, when executed, cause the one or more second processors to at least: receive the plurality of data packets from the master control; and upon receipt of each data packet, transmit an acknowledgment of the data packet to the master control.

The device of any preceding clause, wherein each of the circuit boards comprises an active bank and an inactive bank, and the instructions further cause the one or more second processors to: receive a message from the master control indicating that the piece of software has been successfully installed; and upon receipt of the message, cause the active bank to become the inactive bank and cause the inactive bank to become the active bank.

A method to be performed by a processor of a computing device, the method comprising: receiving an executable file containing one or more pieces of software associated with one or more circuit boards of the computing device; extracting a piece of software from the executable file; determining whether a version of the piece of software is more desirable than a version of software installed on an associated circuit board; and upon determination that the version of the piece of software is more desirable than the version of software installed on the associated circuit board, installing the piece of software onto the associated circuit board by: transmitting the piece of software to the associated circuit board as a plurality of data packets; determining whether an acknowledgment of each data packet is received from the associated circuit board within a threshold time period; and upon determination that acknowledgment of at least one data packet is not received from the associated circuit board within the threshold time period, restarting installation of the piece of software.

The method of any preceding clause, further comprising: upon determination that acknowledgment of the at least one data packet is not received from the associated circuit board within the threshold time period, re-transmitting the at least one data packet to the associated circuit board one or more times until acknowledgment of the at least one data packet is received from the associated circuit board; and restarting the installation of the piece of software when the at least one data packet has been transmitted to the associated circuit board a predetermined number of times without receiving acknowledgment of the at least one data packet within the threshold time period.

The method of any preceding clause, wherein the threshold time period is a threshold amount more than an expected time delay between when a first data packet is transmitted to the associated circuit board and when acknowledgment of the first data packet is expected to be received.

The method of any preceding clause, further comprising: determining whether the piece of software has been successfully installed onto the associated circuit board; and upon determination that the piece of software has not been successfully installed onto the associated circuit board, restarting the installation of the piece of software onto the associated circuit board.

The method of any preceding clause, further comprising determining whether the piece of software has been successfully installed onto the associated circuit board by: calculating a first error detecting code of the piece of software that has been installed onto the associated circuit board; comparing the first error detecting code to a second error detecting code, received along with the executable file, associated with the piece of software; and determining that the piece of software has been successfully installed onto the associated circuit board when the first error detecting code matches the second error detecting code.

The method of any preceding clause, wherein the first error detecting code comprises a checksum.

The method of any preceding clause, further comprising receiving the executable file from a second device connected to the computing device.

The method of any preceding clause, further comprising receiving the executable file from a remote computing device.

The method of any preceding clause, wherein the computing device is associated with a hospital bed.

A non-transitory, computer-readable storage medium comprising one or more programming instructions stored thereon, the one or more programming instructions operable to carry out the method according to any preceding clause.

A system comprising a computing device and medical equipment communicatively coupled to the computing device, the medical equipment including the device of any previous clause.

The system of the preceding clause, wherein the medical equipment comprises a hospital bed.

What is claimed is:

1. A device comprising:
a master control; and
one or more circuit boards;
the master control comprising one or more processors configured to at least:
receive an executable file containing one or more pieces of software associated with one or more of the circuit boards;

extract a piece of software from the executable file;
determine whether a version of the piece of software is more desirable than a version of software installed on an associated circuit board; and
upon determination that the version of the piece of software is more desirable than the version of software installed on the associated circuit board, install the piece of software onto the associated circuit board by:
   transmitting the piece of software to the associated circuit board as a plurality of data packets;
   determining whether an acknowledgment of each data packet is received from the associated circuit board within a threshold time period;
   upon determination that acknowledgment of at least one data packet is not received from the associated circuit board within the threshold time period, re-transmitting the at least one data packet to the associated circuit board one or more times until acknowledgment of the at least one data packet is received from the associated circuit board; and
   restarting installation of the piece of software when the at least one data packet has been transmitted to the associated circuit board a predetermined number of times without receiving acknowledgment of the at least one data packet within the threshold time period.

2. The device of claim 1, wherein the threshold time period is a threshold amount more than an expected time delay between when a first data packet is transmitted from the master control to the associated circuit board and when acknowledgment of the first data packet is expected to be received by the master control.

3. The device of claim 1, wherein the one or more processors are further configured to:
   determine whether the piece of software has been successfully installed onto the associated circuit board; and
   upon determination that the piece of software has not been successfully installed onto the associated circuit board, restart the installation of the piece of software onto the associated circuit board.

4. The device of claim 3, wherein the one or more processors are further configured to determine whether the piece of software has been successfully installed onto the associated circuit board by:
   calculating a first error detecting code of the piece of software that has been installed onto the associated circuit board;
   comparing the first error detecting code to a second error detecting code, received along with the executable file, associated with the piece of software; and
   determining that the piece of software has been successfully installed onto the associated circuit board when the first error detecting code matches the second error detecting code.

5. The device of claim 4, wherein the first error detecting code comprises a checksum.

6. The device of claim 1, wherein the one or more processors are further configured to receive the executable file from a second device connected to the device.

7. The device of claim 1, wherein the one or more processors are further configured to receive the executable file from a remote computing device.

8. The device of claim 1, wherein the device is associated with a hospital bed, and the one or more circuit boards control functionalities of the hospital bed.

9. The device of claim 1, wherein at least one of the circuit boards comprises one or more second processors, and one or more second non-transitory memory modules communicatively coupled to the one or more second processors and storing second machine-readable instructions that, when executed, cause the one or more second processors to at least:
   receive the plurality of data packets from the master control; and
   upon receipt of each data packet, transmit an acknowledgment of the data packet to the master control.

10. The device of claim 9, wherein each of the circuit boards comprises an active bank and an inactive bank, and the instructions further cause the one or more second processors to:
   receive a message from the master control indicating that the piece of software has been successfully installed; and
   upon receipt of the message, cause the active bank to become the inactive bank and cause the inactive bank to become the active bank.

11. A method to be performed by a processor of a computing device, the method comprising:
   receiving an executable file containing one or more pieces of software associated with one or more circuit boards of the computing device;
   extracting a piece of software from the executable file;
   determining whether a version of the piece of software is more desirable than a version of software installed on an associated circuit board; and
   upon determination that the version of the piece of software is more desirable than the version of software installed on the associated circuit board, installing the piece of software onto the associated circuit board by:
      transmitting the piece of software to the associated circuit board as a plurality of data packets;
      determining whether an acknowledgment of each data packet is received from the associated circuit board within a threshold time period; and
      upon determination that acknowledgment of at least one data packet is not received from the associated circuit board within the threshold time period, re-transmitting the at least one data packet to the associated circuit board one or more times until acknowledgment of the at least one data packet is received from the associated circuit board; and
      restarting installation of the piece of software when the at least one data packet has been transmitted to the associated circuit board a predetermined number of times without receiving acknowledgment of the at least one data packet within the threshold time period.

12. The method of claim 11, wherein the threshold time period is a threshold amount more than an expected time delay between when a first data packet is transmitted to the associated circuit board and when acknowledgment of the first data packet is expected to be received.

13. The method of claim 11, further comprising:
   determining whether the piece of software has been successfully installed onto the associated circuit board; and
   upon determination that the piece of software has not been successfully installed onto the associated circuit board, restarting the installation of the piece of software onto the associated circuit board.

14. The method of claim 13, further comprising determining whether the piece of software has been successfully installed onto the associated circuit board by:
- calculating a first error detecting code of the piece of software that has been installed onto the associated circuit board;
- comparing the first error detecting code to a second error detecting code, received along with the executable file, associated with the piece of software; and
- determining that the piece of software has been successfully installed onto the associated circuit board when the first error detecting code matches the second error detecting code.

15. The method of claim 14, wherein the first error detecting code comprises a checksum.

16. The method of claim 11, wherein the computing device is associated with a hospital bed, and the one or more circuit boards control functionalities of the hospital bed.

17. A system comprising:
- a computing device; and
- medical equipment communicatively coupled to the computing device, the medical equipment including the device of claim 1.

18. The system of claim 17, wherein the medical equipment comprises a hospital bed.

* * * * *